G. C. SHANKLE.
SECTION HARROW.
APPLICATION FILED FEB. 9, 1912.
1,026,411.
Patented May 14, 1912.
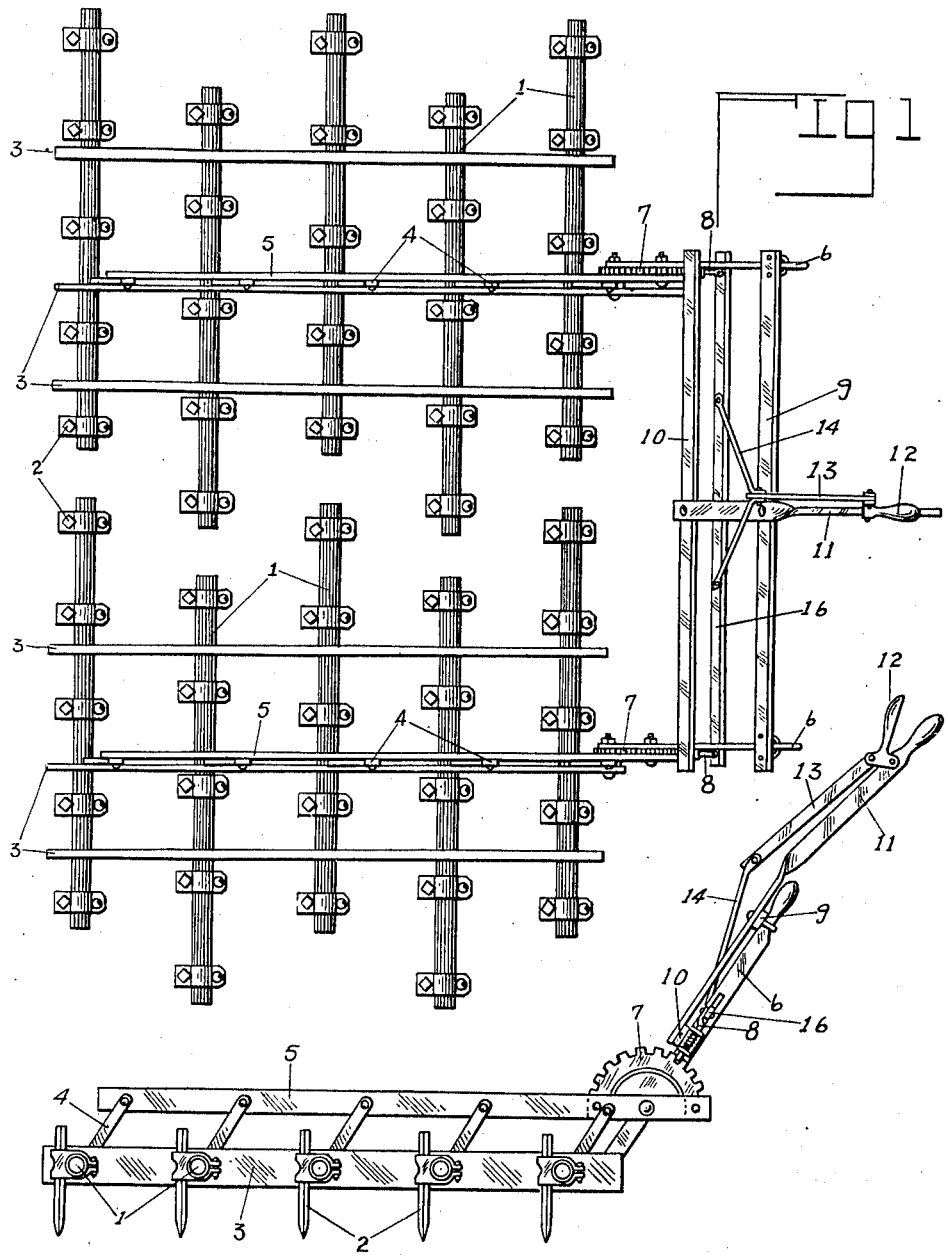
WITNESSES:
J. J. Murray
W. B. Champlin Jr.
INVENTOR
Grover C. Shankle
BY John T. Spellman
ATTORNEY

UNITED STATES PATENT OFFICE.

GROVER C. SHANKLE, OF ENNIS, TEXAS.

SECTION-HARROW.

1,026,411.

Specification of Letters Patent. Patented May 14, 1912.

Application filed February 9, 1912. Serial No. 676,579.

*To all whom it may concern:*

Be it known that I, GROVER C. SHANKLE, a citizen of the United States, residing at Ennis, in the county of Ellis and State of Texas, have invented certain new and useful Improvements in Section-Harrows, of which the following is a specification.

My invention relates to new and useful improvements in section harrows, and its object is to provide a simple and efficient mechanism adapted to be correlated with a harrow comprising any number of sections, for the purpose of producing a simultaneous adjustment of the levers of each section, through the manipulation of a single lever centrally mounted upon the implement.

The object is further to provide a device of the character described that will be strong, durable, and positive in operation, and not likely to get out of working order.

In the accompanying drawing are shown two views of a common type of section harrow, correlated with the novel lever mechanism to which this invention relates, Figure 1 being a plan view, and Fig. 2 a side elevation of the implement.

Like reference characters are employed in the two figures to designate similar parts; since the two harrow sections are alike in all respects, a description of one will suffice for both.

Each harrow section comprises a plurality of tubular beams 1, upon each of which are rigidly mounted a plurality of harrow teeth 2, said beams being extended transversely through a number of bars 3 parallel with the direction of travel. Each harrow section is provided with a lever mechanism by which the beams 1 may be simultaneously rocked, in order to adjust the angle formed by the teeth with the ground, the bars 3 forming bearings to permit such a rocking motion. This mechanism comprises a plurality of arms 4, one of which projects rigidly upward from each beam 1 adjacent to the central bar 3 of the section. The upper ends of the arms 4 have pivoted connection with a bar 5, mounted substantially above the central bar 3. Upon the rear end of the said bar 3 is pivoted the lower extremity of a lever 6, which also has pivoted connection with the rear end of the bar 5. A toothed quadrant 7 is carried by the bar 5 and has its center coincident with the pivot joining the lever 6 to said bar.

The usual spring-pressed plunger 8 is mounted upon the lever 6, for the purpose of engaging the teeth of the quadrant and thereby holding the lever in various positions of adjustment.

The form of section harrows above described is commonly used in a great many modified forms, to any of which there may be attached the lever mechanism now to be explained. The two section levers 6 are rigidly connected by two horizontal bars 9 and 10, the former being attached to the levers just below their handle portions, and the latter just above the quadrants which are correlated with the levers. The centers of the two bars 9 and 10 serve to rigidly support the lower portions of a lever 11, which lever is adapted to impart through said bars a simultaneous angular displacement to the levers 6, when the plungers 8 have been first disengaged from their respective quadrants. In order to accomplish this last mentioned result, a bell crank 12 is pivoted upon the handle portion of the lever 11, and a bar 13 substantially parallel with the lever has its upper end pivotally connected with the short arm of the bell crank. The lower extremity of the bar 13 is pivotally attached to the upper ends of two rods 14, extending downwardly and diverging laterally, their lower ends being secured to a horizontal bar 16 which connects the two spring-pressed plungers 8.

When it is desired to permit the teeth to swing to a horizontal position during the travel of the implement, it is necessary only to operate the bell crank 12 by which the plungers 8 are disengaged from their correlated quadrants. The friction between the points of the harrow teeth and the ground will immediately cause the beams 1 to rock through such an angle that the teeth will lie flat upon the ground.

Since in the present practice, it is necessary to separately adjust the teeth of different sections of a harrow, it is apparent that considerable annoyance and trouble will be eliminated by providing a single lever mechanism to accomplish the desired result. It is to be particularly observed that the invention is not limited in its application to any particular type of section harrow, since it may lie readily attached to section now in use without subjecting the implement to any alterations.

The invention is presented as including all such modifications and changes as come within the scope of the following claim.

What I claim is:

In a device of the character described, the combination with a plurality of harrow sections, of a lever associated with each section for adjusting the teeth thereof at various angles, and a supplementary lever by which the section levers may be simultaneously adjusted.

In testimony whereof I have signed my name to this specification in the presence of two subscribing witnesses.

GROVER C. SHANKLE.

Witnesses:
EDMUND RAPHAEL,
LOUIS CERF.

Copies of this patent may be obtained for five cents each, by addressing the "Commissioner of Patents, Washington, D. C."